United States Patent [19]

Speker

[11] Patent Number: 4,700,689

[45] Date of Patent: Oct. 20, 1987

[54] COVER FOR FRYING AND COOKING APPLIANCES

[76] Inventor: Karl J. Speker, Schickhardtstrasse 19, D 7000, Stuttgart 1, Fed. Rep. of Germany

[21] Appl. No.: 830,538

[22] Filed: Feb. 18, 1986

[30] Foreign Application Priority Data

Feb. 19, 1985 [DE] Fed. Rep. of Germany ....... 3505630

[51] Int. Cl.⁴ ............................................. A47J 27/58
[52] U.S. Cl. .................................... 126/384; 126/385; 220/256; 220/287; 220/369; 220/85 CH
[58] Field of Search ............... 126/386, 385, 384, 383, 126/214 D; 220/4 A, 4 C, 8, 228, 254, 256, 287, 306, 369, 85 CH

[56] References Cited

U.S. PATENT DOCUMENTS

| 984,318 | 2/1911 | Thomas . | |
|---|---|---|---|
| 1,627,099 | 5/1927 | Landgren et al. . | |
| 2,385,594 | 9/1945 | Witte, Jr. | 126/384 |
| 2,428,894 | 10/1947 | Serio | 126/384 X |
| 2,559,196 | 7/1951 | Medved | 259/116 |
| 3,439,603 | 4/1969 | Reames | 99/355 |
| 3,937,210 | 2/1976 | Kachaylo | 126/384 |

FOREIGN PATENT DOCUMENTS

| 2608976 | 3/1976 | Fed. Rep. of Germany . | |
|---|---|---|---|
| 8324805 | 8/1984 | Fed. Rep. of Germany . | |
| 3311247 | 10/1984 | Fed. Rep. of Germany . | |
| 39155 | 10/1930 | France . | |
| 695369 | 12/1930 | France | 220/369 |
| 764780 | 5/1934 | France | 126/384 |

Primary Examiner—Randall L. Green
Attorney, Agent, or Firm—Harness, Dickey & Pierce

[57] ABSTRACT

A cover for frying and cooking appliances comprises a hood portion (12) exhibiting a conical shape over part of its height. The cover is adapted for being fitted from above into a toroidal collar (14) mounted on the said appliance (12, 25). The said collar (14) is provided with an upwardly extending rim (20, 20a) on its outside and with a channel (23) on its bottom. In order to ensure, without any sacrifice as regards the quality of the fried food, that no fat or water can splash out the hood portion (12) is provided at its vertex with an opening (13) and the hood portion (12) is retained by holders at a vertical distance above the channel (23) and at a lateral distance beside the upwardly extending rim (20, 20a).

11 Claims, 6 Drawing Figures

COVER FOR FRYING AND COOKING APPLIANCES

The present invention relates to a cover for frying and cooking appliances comprising a hood portion exhibiting a conical shape over part of its height and adapted for being fitted from above into a toroidal collar mounted on the said appliance, the said collar being provided with an upwardly extending rim on its outside and with a channel on its bottom.

A cover of this type has been known before from U.S. Pat. No. 1 627 099.

It has been known before to cover frying and cooking appliances, in particular frying pans, pots and kettles, with covers intended essentially to serve two purposes. On the one hand, the said covers are to serve as protection against splashing fat, while on the other hand they are also to increase the temperature at the surface of the piece of meat being prepared so as to reduce the preparation time and, in addition, to help save energy.

However, when a cover sealing a pan or pot off on all sides is used, for example, on a frying pan, the two before-described purposes are actually achieved, because no fat can splash out through the closed cover and a relatively high temperature is obtained under the cover, but the use of such a cover which is closed on all sides gives poor results as regards the taste.

For, during the process of heating the meat the water attached to the meat escapes in the form of steam and gets mixed with the partly vaporizing, partly splashing fat to form the so-called vapors. Now, when these vapors are retained within a closed cover, the surface of the piece of meat remains under the effect of the enclosed steam. Instead of taking on the desired crisp surface, the meat therefore assumes a soft and spongy consistency so that the practical advantages achievable by the use of a closed cover do not pay off in view of the disadvantages as regards the taste resulting therefrom.

The before-mentioned U.S. Pat. No. 1 627 099 discloses a cover for frying pans comprising a toroidal collar portion provided with a handle of its own and arranged for being mounted first on the frying pan. The collar portion consists of two concentrical cylindrical sheet steel walls which are set off vertically relative to each other, the inner cylindrical sheet steel wall being arranged below the outer wall. A radial bottom leads from the lower edge of the outer cylindrical sheet steel wall to the inner cylindrical sheet steel wall so as to form between the two walls a channel extending about the whole periphery. A conical hood portion with a closed top can be inserted into the collar portion from above. The outer diameter of the hood portion is equal to the inner diameter of the outer cylindrical wall. The hood portion rests on three noses which are distributed over the periphery of the outer cylindrical wall. The cone formed by the hood portion has an angle of inclination of 30°.

However, it is a disadvantage of this known cover that the closed cone-shaped hood portion rests tightly on the collar portion and that the latter rests in turn tightly on the frying pan so that the entire frying pan is sealed off on top. Thus, the before-described disadvantages are obtained due to the enclosed steam.

Another cover for frying pans has been known from U.S. Pat. No. 984 318. A collar portion comprising a plurality of bends has its periphery tightly seated on the upper edge of the frying pan. A hood portion in the form of a truncated cone is placed on the upper periphery of the collar portion, likewise in tight relationship. A lateral handle permits the hood portion to be opened in the manner of a hinge to allow the user to observe the contents of the pan.

However, this known cover has the disadvantage that there is no collecting channel whatever for the vapors at the bottom of the hood portion or the collar portion so that the disadvantages of the prior art described before are encountered here, too, to their full extent.

Another cover has been known from German Disclosure Document No. 26 08 976. The hood described by this publication has the shape of a flat truncated cone and comprises an opening at the latter's vertex. The outer diameter of the lower edge of the known cover is larger than the diameter of the pan to be covered. Accordingly, the cover is placed over the upper edge of the pan and rests on nose-shaped holders projecting laterally from the outer walls of the pan. Due to the different diameters, there remains an annular gap between the pan and the cover through which air is permitted to penetrate from below into the space below the cover, to get mixed with the vapors and to escape finally through the opening in the top of the cover.

The lower edge of the known cover is folded over inwardly so that an annular channel is obtained which serves to collect the vapors which condense on the inside of the cover and run down to gather in the said channel. However, the known cover is connected with a number of disadvantages:

The annular channel is positioned outside of and below the edge of the covered pan so that splashing fat may splash over the rim of the pan onto the hotplate or the stove, through the lateral gap between the edge of the pan and the edge of the cover. On the other hand, exhibiting an angle of inclination of the truncated cone of approx. 28°, the known cover is relatively flat so that condensed vapors running down the inside of the cover may drip off the hood, in particular when several drops of condensed vapors gather. If such dripping off occurs in the area of the lateral gap between the cover and the pan, the condensed vapors will also drip on the hotplate or the stove.

Further, it is a disadvantage of the known cover that special pans comprising outwardly projecting nose-shaped holders must be used because if no such holders existed, the cover would rest tightly on the upper rim of the pan so that the disadvantages described before would be obtained The same applies analogously to pots and grill plates, i.e. plates incorporated in the hotplate surface for grilling pieces of meat directly and without the use of any pots or pans. In these cases, too, the known cover cannot be used because its use is absolutely dependent on the existence of additional holders. And for the same reason, the pans or pots to be used in combination with the known cover must be provided with handles which are fastened to the pan at a position somewhat below its upper rim, while with modern pans the upside of the handle frequently ends flush with the edge of the pan.

Still another disadvantage of the known cover is to be seen in the fact that due to the relatively flat design and the channel formed integrally on its lower rim, cleaning of the cover is very difficult. This is particularly annoying because the condensed vapors gather in the area of the channel and the fatty components and the meat juice contained therein tend to form very rapidly a sticky mass which is very difficult to remove.

Finally, it is a further substantial disadvantage of covers of this type that the desired air flow introduced "from below", i.e. through the lateral slot between the channel and the edge of the pan, does not give the desired results.

Another cover known from German Utility patent No. 83 24 805 comprises a lower hollow cylindrical portion spanned on top by a lid in the form of a boiler end. This known cover is provided with inwardly projecting hooks by means of which it is applied on the upper rims of pots or pans. The outer diameter of this known cover is again larger than the diameter of the pot or pan, and the annular channel formed integrally with the lower rim is again positioned outside of and below the upper edge of the pan. Thus, this known cover offers practically the same advantages as have been described before.

Finally, different other anti-splash devices for cooking appliances exhibiting the shape of a truncated cone have been known from German Disclosure Document No. 33 11 247, but these devices are not provided with collecting channels at their lower edges.

Now, it is the object of the present invention to improve a cover of the type described above in such a manner that the disadvantages set forth above are avoided. In particular, this invention has for its object to provide a cover which ensures on the one hand optimum air circulation while preventing on the other hand safely fat from splashing out, which is suited for being used for a great number of cooking and frying appliances and which, finally, is easy to use and, in particular, easy to clean.

According to the invention, this object is achieved by an arrangement in which a toroidal collar comprising on its outside an upwardly extending rim and, on its bottom, a channel can be fitted upon the pot or pan, in which the hood portion can be positioned from above loosely upon the said collar, in which holders are provided for holding the hood portion at a certain vertical distance above the channel and at a certain lateral distance beside the upwardly extending rim, and in which the clear inner diameter of the collar is smaller than that of the hood portion.

This arrangement solves the object of the invention fully and perfectly.

For, by subdividing the cover into a hood portion and a collar portion it is ensured that all edges and corners of the hood are easily accessible and that, in particular, the collecting channel can easily be cleaned, because it is readily accessible once the hood portion has been removed.

Further, the cover of the invention is suited for being used in connection with a plurality of frying and cooking appliances because the collar can be fitted from above on any desired pan, pot or grill plate without any additional holders being required. The required spacing between the hood portion and the collar is produced by the collar itself so that no such holders are required at the bottom of the collar. This applies in particular to pots and pans comprising handles the upsides of which end flush with the upper rim of the pot or pan so that covers of the type described at the outset cannot be applied. But this also applies to grill plates where covers of the type described at the outset cannot be used, either.

The vertical and lateral spacing between the hood portion and the collar ensures in addition optimum air circulation so that the amount of steam being evacuated from the cover is just ideal to guarantee that on the one hand the meat will be able to develop a crisp surface while on the other hand the temperature below the cover is maintained at a sufficiently high level.

Finally, it is ensured by the fact that the hood portion is inserted into the collar from above that no fat can splash out through the gap and no condensed vapors can drip upon the hotplate or the stove through the gap.

A cover according to the invention is similarly suited for frying pans, pots, kettles and grill plates.

Preferably, the hood portion consists of a transparent material, because this permits the piece of meat to be observed during its preparation without the need to remove the hood portion.

A particularly favorable effect is achieved when the diameter of the opening is smaller than one fifth and larger than one twentieth of the diameter of the lower edge. Further, the cover preferably is designed in such a manner that the angle of inclination of the conical face of the hood portion is between 35° and 45°. Finally, it is preferred that the vertical spacing and the lateral spacing are substantially equal and between one tenth and one twentieth of the diameter of the lower edge.

Practical experiments have shown that the beforementioned preferred dimensions of a cover according to the invention give optimum results.

According to another embodiment of the invention, the collar is provided on its lower end with an inclined bottom tapering inwardly and downwardly.

This feature provides the advantage that due to the conicity of the bottom the collar can be applied to pots or pans of different diameters. This is particularly important because with the usual cooking and frying appliances only the diameter of the bottom is standardized because it has to match specific hotplate diameters, while the diameters of the upper edges of such appliances vary within considerable limits due to the different angles of inclination of their side walls. The conical bottom permits, however, such variations in diameter to be spanned within a range of several centimeters.

In the described embodiment, the preferably inclined bottom may form the outer delimitation of the channel which exhibits a substantially triangular cross-sectional shape.

This feature provides the advantage of a particularly simple structure because to obtain the desired collecting channel it is necessary only to provide an additional inclined and upwardly tapering extension a short distance inwardly on the inwardly tapering inclined bottom.

In a still further embodiment of the invention, the bottom of the collar is provided with a downwardly extending cylindrical extension.

This feature provides the advantage that when the collar is placed on pots or pans, it is in this manner safely protected from slipping off laterally or being displaced. In addition, when placed on grill plates, such an extension may serve the purpose to establish a certain minimum spacing from the plate itself.

According to another preferred embodiment of the invention, the lower rim of the hood portion is formed by a cylindrical extension extending downwardly from the edge of the conical portion.

This feature provides the advantage to form a defined dripping line for the condensed vapors running down the cover, which line can be positioned exactly above the collecting channel.

According to still another, particularly preferred embodiment of the invention, the conical surface defined by the upper edge of the upwardly projecting rim and the upper inner edge of the channel are touched or intersected by the lower edge of the hood portion.

For, this feature provides the essential advantage that there is no straight "flight path" through the space between the collar and the hood portion so that splashing fat is prevented safely from passing through the gap. In most of the cases it would, however, be sufficient for the lower edge of the hood portion to be arranged at a small distance from the said conical surface because fat splashing upwardly from the bottom of the pan always follows a curved path.

According to another embodiment of the invention, the hood portion is seated from above in S-shaped hooks, with the upper bend of the hook engaging the upwardly projecting rim of the collar and the lower bend of the hook holding the lower rim of the hood portion.

This feature provides the advantage that the hood portion rests on the collar on a few, for instance three, points only so that the entire remaining periphery of the hood portion is available for air circulation. In addition, it is very easy thanks to this design to fit the hood portion on the collar from above, for example by reaching with a finger through the upper opening of the hood portion, or by means of a handle provided on the hood portion. And the cover can also be disassembled very easily for cleaning purposes after use.

According to a variant of the before-described embodiment of the invention, the upper and/or the lower hook portions may be designed in such a manner that the upwardly projecting rim and/or the lower rim can be snapped into place.

One obtains in this manner a temporary mechanical connection between the hood portion and the collar through elastic engagement which may be sufficient, for instance, for lifting the hood and collar assembly off the pan or pot by means of a handle fixed to the hood portion. The hood portion can then be disengaged easily from the collar for cleaning purposes.

According to another preferred embodiment of the invention, collars of different diameters are provided for different pot and pan diameters, the channels and holders of the collars being designed in such a manner that the same hood portion can be fitted on all collars.

This feature provides the advantage that even in the case of very broad variations in the diameters of the upper rims of the pots and pans to be used, the same hood portion can be used in all cases. This saves not only costs, but also storage space.

In addition or as an alternative to the before-mentioned variant, where the cover is to fit different pot and pan diameters, the hood portion may also be subdivided along a horizontal plane, with an upper hood section of constant size being followed in this case by a lower hood section in the form of a truncated cone the bottom diameter of which corresponds to the diameter of the pot or pan to be used at any time.

This embodiment again provides the advantage that the same upper hood section can be used for all pot and pan sizes.

According to a further improvement of this variant, the angles of inclination of the surfaces of the two hood sections are equal.

In this manner, the advantageous effects described in connection with the one-piece hood portion are fully preserved.

In a further variant of this embodiment of the invention, the upper hood section is made from a transparent material, while the lower hood section consists of metal, preferably copper or stainless steel.

This measure provides the advantage that it helps save costs, in particular in the case of large covers, because the upper hood section made from a transparent material is much more expensive than the lower hood section made from copper or stainless steel. This permits such large covers to be produced at reasonable cost. And such a design also limits the costs if such a two-piece cover should be dropped because in this case only the upper hood section, which may for example consist of glass, can break while the lower metal hood section can be re-used.

According to a particularly preferred variant of this embodiment of the invention, the upper hood section is designed to overlap the lower hood section in the contact area by a pre-determined length of the line of slope, the two hood sections forming between them in the overlapping area a gap of a pre-determined height.

This measure provides on the one hand the advantage that air can penetrate laterally into the upper hood section through the overlapping area between the two hood sections so that the stack effect of the cover is further improved.

On the other hand, however, this variant also provides the advantage that defined paths are established for the condensed vapors running down the undersides of the hood sections without an undesirable dripping edge being formed between the hood sections in the area of the separating plane.

Finally, there are other preferred embodiments of the invention in which the hood portion and/or the collar are provided with a handle.

This feature facilitates handling of the cover, and two handles provided on the cover and on the collar facilitate their disengagement, in particular in cases where the hood portion and the collar are snapped into place.

Other advantages of the invention will become apparent from the specification and the attached drawing.

Some examples of the invention will be described hereafter in detail with reference to the drawing in which.

Figure 1:
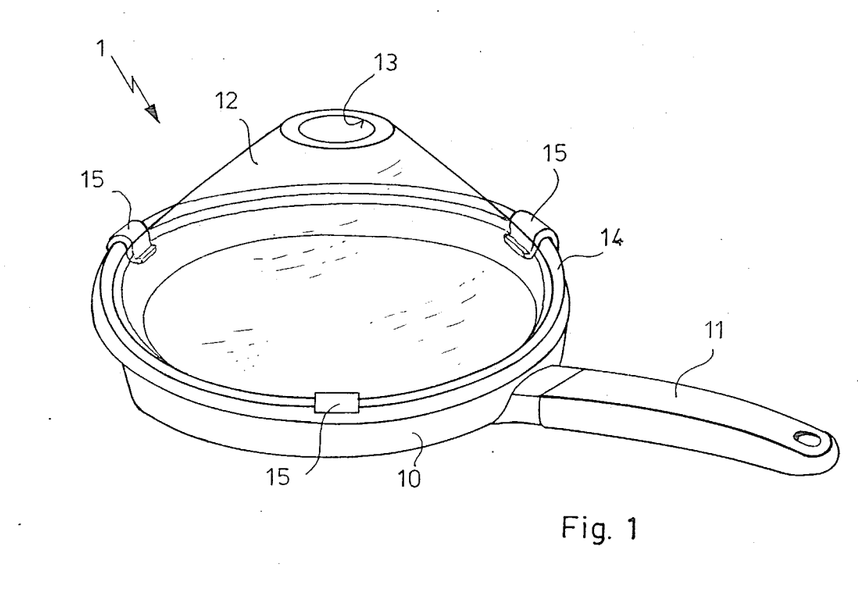
FIG. 1 shows a perspective view of a frying pan with a cover according to the invention applied thereon.
Figure 6:
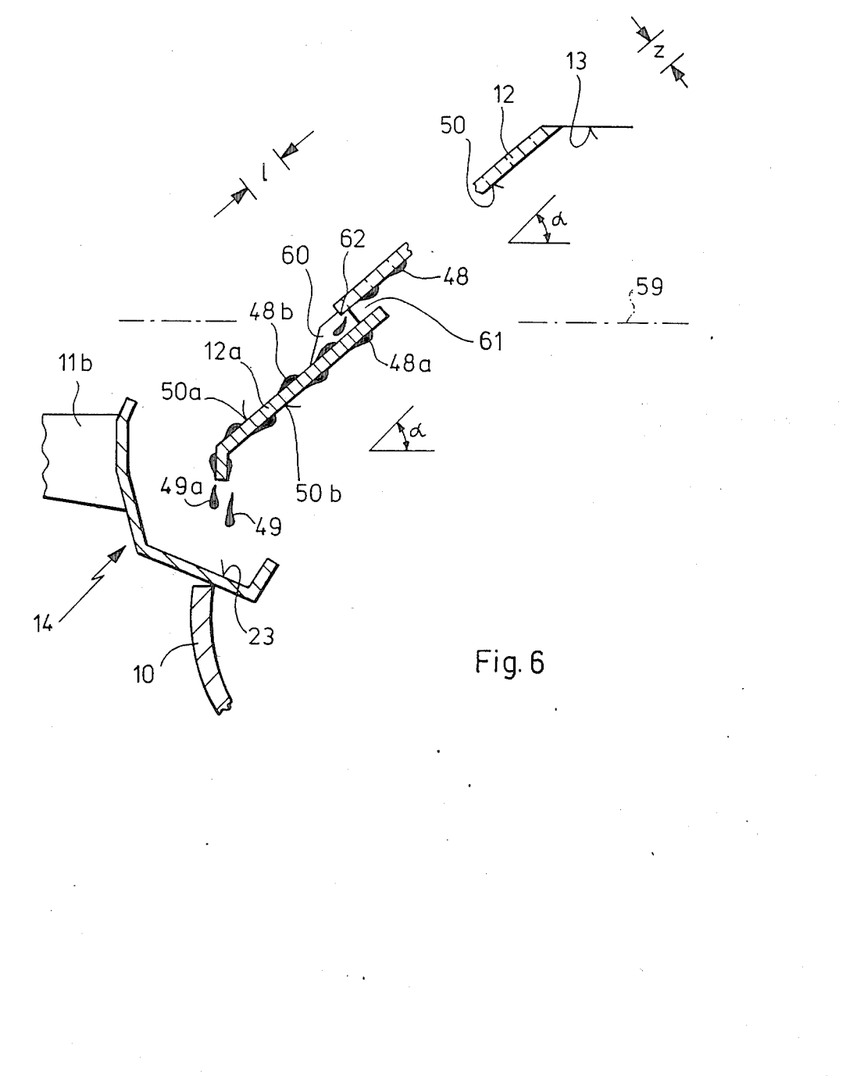
FIG. 6 is a representation similar to FIG. 5, but showing a two-piece hood portion.

FIG. 1 shows a frying pan 10 with a handle 11 of the usual design. A cover 1 applied on the frying pan 10 comprises a hood portion 12 and a collar 14. The hood portion 12 has the shape of a truncated cone and is provided with an opening 13 at its vertex. The collar 14 is superimposed upon the upper rim of the frying pan 10 so that the latter cannot be seen in FIG. 1. Several hooks 15 which are distributed over the periphery of the collar 14 support the lower rim of the hood portion 12. Additional handles 11a, 11b may be provided on the hood portion 12 (FIG. 2) and/or on the collar 14 (FIG. 6).

Figure 2:
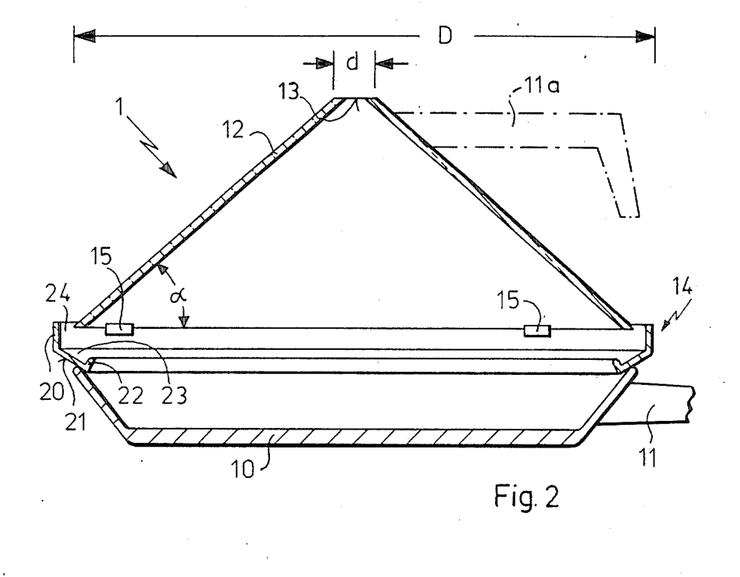
FIG. 2 is a longitudinal cross-section through the arrangement shown in FIG. 1.

The above arrangement can be seen with greater clarity in FIG. 2, which shows a cross-section through the arrangement of FIG. 1.

The collar 14 comprises three sections, namely an outer, upwardly projecting rim 20, an inclined bottom 21 and an inner, inclined extension 22. The rim 20 exhibits a hollow cylindrical shape, while the shapes of the bottom 21 and the extension 22 are that of truncated cones.

The bottom 21 and the extension 22 form together an annular channel 23.

The hood portion 12 may be held for example by a handle 11a and placed loosely from above upon the hooks 15. The outer diameter D of the hood portion 12 is smaller than the diameter of the upwardly extending rim 20, but larger than the clear inner diameter of the rim of the extension 22. Accordingly, there remains a gap 24 between the lower rim of the hood portion 12 and the collar 14.

In a preferred embodiment of the invention, the diameter d of the opening 13 is between one fifth and one twentieth of the diameter D of the hood portion 12, for example d=2 cm and D=20 cm.

The angle of inclination of the hood portion 12 is preferably between 35° and 45°.

As regards the gap 24, those embodiments are preferred in which the vertical distance y (see FIG. 3) between the hood portion 12 and the channel 23 is approximately equal to the lateral distance x between the hood 12 and the upwardly extending rim 20, these distances being in the range of one tenth to one twentieth of the diameter D of the hood portion 12. For example x=y=2 cm for D=20 cm.

Figures 3, 4:
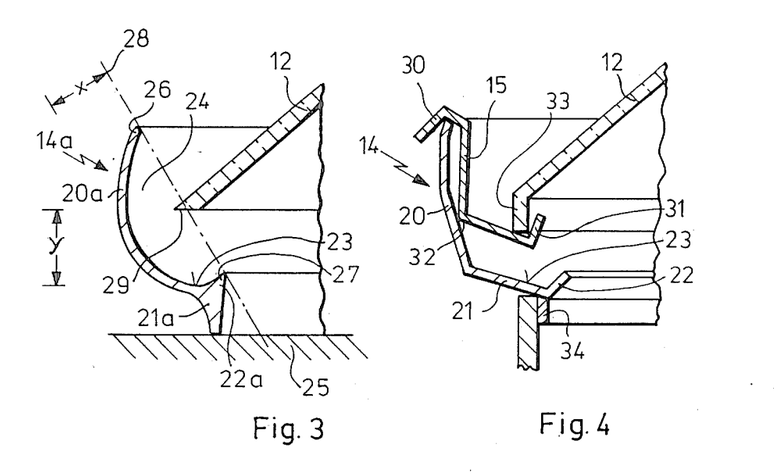
FIG. 3 shows an enlarged cross-section through another embodiment of the invention illustrating the interaction between the hood portion and the collar.
FIG. 4 shows a variant of the representation of FIG. 3, illustrating the way in which the hood is held in the collar portion.

FIG. 3 shows—though for a slightly modified embodiment—a detail of the rim portion of the arrangement of FIG. 2.

It will be seen that the elements 20a, 21a, 22a of the collar 14a are integrally formed in this case without, however, the function of the cover being impaired by this design.

In addition, FIG. 3 illustrates that the collar 14a and, thus, the entire cover can be used not only on pots and pans, but also on a large-area grill plate 25 on which pieces of meat can be fried directly without the use of any pots or pans.

Finally, FIG. 3 illustrates in detail how fat can be prevented from splashing out of the interior of the hood portion 12 by properly selecting the shape and the position of the collar 14 and the hood portion 12. An upper edge 26 of the upwardly extending rim 20 and an upper edge 27 of the inclined extension 22 define a plane in the form of a cone-shaped shell which is indicated in FIG. 3 by the straight line 28. There is no "straight" flight path through the gap 24 when the surface 28 is touched or intersected by a lower edge 29 of the hood portion 12, though the intended purpose will substantially be reached also when the edge 29 is provided at a small distance from the plane 28 because the flight path of splashing fat is always a little curved upwardly.

FIG. 4 shows in a representation similar to that of FIG. 3 by way of an embodiment similar to that of FIG. 2 how the hood portion 12 can be held in the collar 14. To this end, S-shaped hooks 15 are, provided, with the upper portion of the hook 30 engaging the upwardly extending rim 20, the lower hook portion 31 engaging the lower rim of the hood portion 12 and the central portion of the hook 32 resting against the collar 14.

The hooks 15 may be applied loosely upon the collar 14, or be clamped thereon by folding over the upper hook portion 30, or be fastened by welding, screwing, riveting, or the like. It is, however, also possible, by kinematic reversal, to mount them in an analogous manner on the lower rim of the hood portion 12.

In a particularly preferred embodiment, the hooks 15 are firmly connected with the collar 14 and the lower hook portions 31 are shaped in such a manner that the lower rim of the hood portion 12 can be snapped elastically into the hooks 15. The holding force of the snap connection must in this case be large enough to permit the hood portion 12 to be handled together with the collar 14, for example by means of a handle 11a, so that the two parts have to be disengaged only for cleaning purposes.

It is further apparent from FIG. 4 that the lower end of the hood portion 12 may be provided with a cylindrical extension 33 forming a defined dripping plane for the condensed vapor running down the sides.

A cylindrical extension 34 may also be provided on the lower end of the bottom 21 of the collar 14. Such an extension 34 prevents the collar 14 and, thus, the entire cover from being displaced and sliding down laterally. FIG. 4 shows the case where the diameter of the cylindrical extension 34 conforms exactly with the clear inner diameter of the pan, but it is obvious that the collar 14 can be applied also on pans of larger diameters in which case it will center itself due to the conical shape of its bottom 21.

Figure 5:
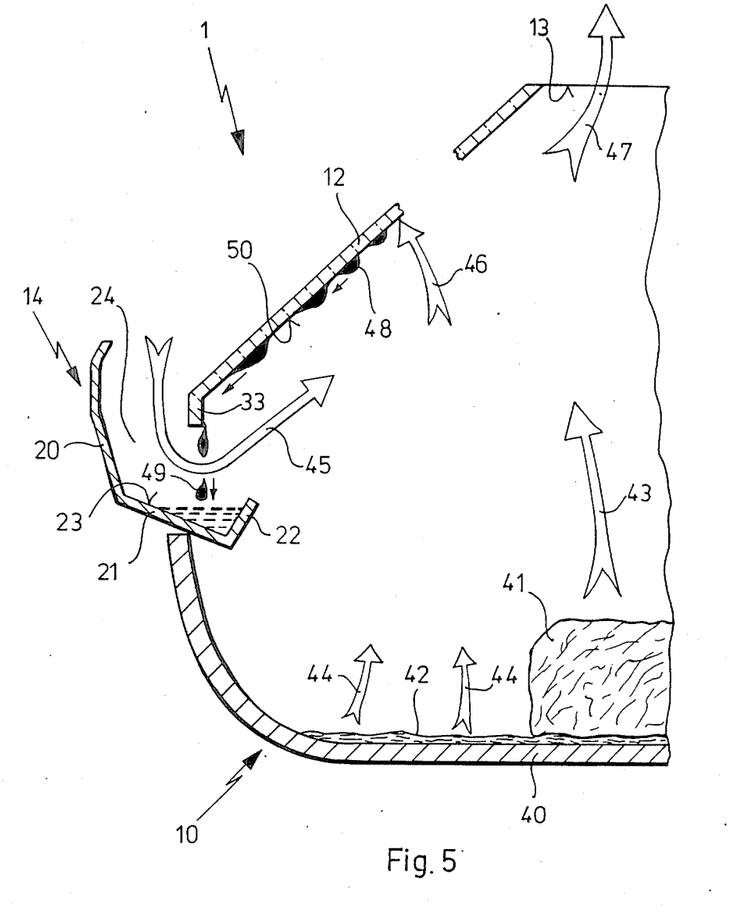
FIG. 5 shows another cross-sectional representation illustrating how the total arrangement works.

FIG. 5 illustrates the function of the cover according to the invention.

A piece of meat 41 can be seen lying in molten fat 42 on the bottom 40 of a frying pan 10. The piece of meat 41 releases vapors 43 consisting substantially of vaporized water and meat juice. In contrast, the molten fat 42 releases splashing and vaporized fat which is indicated in the drawing at 44. The gap 24 between the collar 14 and the hood portion 12 permits air 45 to enter the interior of the pan 10 and to get mixed with the vapors formed by 43 and 44. Part of these vapors settles at 46 on the hood portion 12, which is cooled by the outside air, while another part of the vapors escapes to the outside at 47 through the opening 13. The condensed vapors 46 run down the inner face 50 of the hood portion 12 in condensed form 48; they drip off the dripping edge defined by the cylindrical extension 33 and are collected in the channel 23.

Thus, the arrangement according to the invention ensures that the undesirable vapor components will either escape from the pan at 47 or else be condensed in a controlled manner and collected in the channel 23 so that a crisp surface can be obtained on the upside of the piece of meat 41 while the desired effect of the cover, i.e. the reduced preparation time, is still maintained. It is also easily apparent from FIG. 5 that the splashing out of fat or steam through the gap 24 is safely prevented, as is the dripping off of condensed vapors 48 in an area outside of the pan 10. Finally, it is easily seen that the channel 23 is very easy to clean from the top when the hood portion 12 is lifted off.

FIG. 6 shows a variant of the arrangement shown in FIG. 5, comprising a two-piece hood portion. The variant of FIG. 6 may serve to adapt the arrangement to different pot and pan diameters. The hood portion is subdivided in this case along a horizontal plane 59 into two sections exhibiting both the shape of truncated cones, i.e. an upper hood section 12 and a lower hood section 12a. In this manner, only the lower hood section 12a has to be exchanged for different pot and pan diameters, while the upper hood section 12 can always remain the same. However, as will become apparent from the further description of this embodiment, this subdivision provides still other advantageous effects so that the application of this embodiment of the invention is not only restricted to the use for different pot and pan diameters.

It appears from FIG. 6 that the surfaces of the hood sections 12, 12a are inclined by the same angle of inclination, which means that the surfaces extend in parallel to each other. However, the upper hood section 12 overlaps the lower hood section 12a in the contact area by a length l of a line of slope, with a space 61 of a height z being formed between the two sections.

The upper main section 12 consists preferably of a transparent material, such as glass, while the lower hood section 12a is made from metal, for example copper or stainless steel. This permits on the one hand to observe the meat being prepared in the pan, while on the other hand the excessively high costs that would be caused by very large covers made entirely from glass are avoided.

The upper hood section 12 is seated on the lower hood section 12a via holders 60. For example, three such holders may be distributed over the periphery in the overlapping area. The holders 60 may, for instance, take the form of metal noses welded or soldered to the lower metal hood section 12a.

As is clearly apparent from FIG. 6, the condensed vapors 48 run along the inner face 50 of the upper hood section 12, drip off the latter's lower edge 62 and into the space 61 and from there upon the upper face 50a of the lower hood section 12a where they continue their way along the said upper face 50a until they finally reach the channel 23 in the form of drops 49a.

The vapors 48a condensing on the lower hood section 12a run along the inner face 50b of the lower hood section 12a and are also collected in the channel 23 in the form of drops 49.

In this manner, it is ensured that defined dripping paths are provided for all condensed vapors 48, 48a, 48b and that all of them gather in the channel 23 so that no condensed vapors 48 to 48b can get outside of the area of the cover. The overlapping l, z further ensures that no splashing fat can pass through the space between the hood sections 12, 12a.

One also sees very clearly in FIG. 5 that the space 61 permits additional outside air to enter the space below the upper hood section 12, which increases the stack effect of the cover as a whole still further.

What is claimed is:

1. A cover for frying and cooking appliances comprising in combination:
   a lid of truncated and conical shape;
   said lid having an upper opening and a lower opening surrounded by a lower lid rim, said lower opening being five to twenty times larger in diameter than said upper opening;
   said lid comprising a wall of transparent material, said wall tapering from said lower opening at an inclination angle between 35 and 45 degrees;
   a handle attached to said lid;
   a toroidal collar mounted on said appliance and having an upper collar wall portion extending vertically and ending in an upper collar rim;
   a first lower collar wall portion extending from below said upper collar wall portion in a downward and inward direction;
   a second lower collar wall portion extending from below said first collar wall portion in an upward and inward direction and ending in a lower collar rim;
   said first and second lower collar wall portions forming a circumferential channel to receive and collect condensed vapor, meat juice, and fat;
   hook means having an upper hook portion attached to said upper collar wall portion and having a lower hook portion being made as a bend to allow said lid to be snapped into said hook means by introducing said lower lid rim into said bend and exerting a force on said handle in a vertical direction, said bend, in turn, exerting a holding force on said lid, in its snapped-in position to allow on the one hand said lid and said collar to be handled together by gripping said cover by said handle but allowing, on the other hand, to again manually disengage said lid from said collar;
   said hook means being shaped and positioned in said collar such that when said lid is snapped into said position, said lower lid rim is retained at a vertical distance above said circumferential channel and at a lateral distance beside said upper collar wall portion;
   said lower lid rim, when being in said position, intersecting a conical surface defined by said upper collar rim and said lower collar rim, thus effectively preventing fat, mean juice, or water spurting from said appliance out of said cover on the path between said lid and said collar.

2. The cover of claim 1, wherein said cooking appliance is a frying pan.

3. The cover of claim 1, wherein said cooking appliance is a grill plate.

4. The cover of claim 1, wherein said vertical distance and said lateral distance are approximately equal and between one tenth and one twentieth of said diameter of said lower lid rim.

5. The cover of claim 1, wherein said collar is provided with a downwardly projecting cylindrical extension at a transition between said first and second lower collar wall portions.

6. The cover of claim 1, wherein said lower lid rim is formed by a cylindrical extension projecting downwardly from a lower edge of said conical wall.

7. The cover of claim 1, wherein collars of different diameters are provided for different pot and pan diameters, said channels and hook means of said collars being designed such that the ame lid can be fitted on all said collars of different diameter.

8. The cover of claim 1, wherein collars of different diameters are provided for different pot and pan diameters, and further wherein said lid includes an upper lid element of truncated conical shape having said upper opening and an intermediate lower opening and a lower lid element of truncated conical shape having said lower opening of said different diameters but having an intermediate upper opening of constant diameter, and means for supporting said upper lid element on said lower lid element.

9. The cover of claim 8, wherein the walls of said upper and lower lid elements taper at the same angle of inclination.

10. The cover of claim 8, wherein said lower lid element is made of metal, preferably copper or stainless steel.

11. The cover of claim 8, wherein said upper lid element is designed to overlap said lower lid element by a predetermined length of the line of slope, said upper lid element and said lower lid element forming between them in an overlapping area a gap of a predetermined height.

* * * * *